Figure 1:
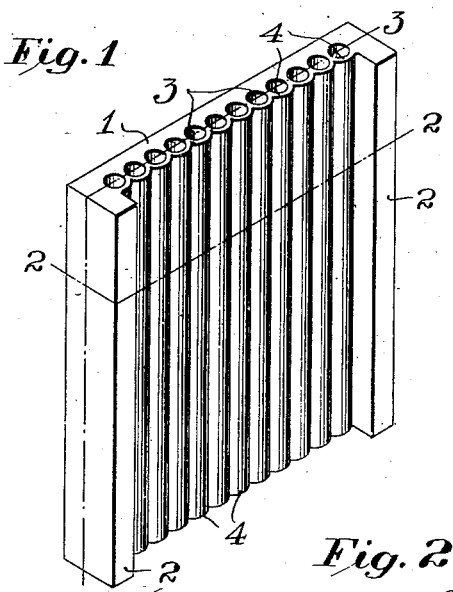

No. 839,815. PATENTED JAN. 1, 1907.
F. A. DECKER.
MANUFACTURE OF ELEMENTS FOR BATTERIES OR ELECTROLYTIC APPARATUS.
APPLICATION FILED MAY 9, 1904.

3 SHEETS—SHEET 1.

WITNESSES
J. Snyder.
Utley E. Crane Jr.

INVENTOR
Frank A. Decker
BY
Chas. N. Butler
ATTORNEY.

No. 839,815. PATENTED JAN. 1, 1907.
F. A. DECKER.
MANUFACTURE OF ELEMENTS FOR BATTERIES OR ELECTROLYTIC APPARATUS.
APPLICATION FILED MAY 9, 1904.
3 SHEETS—SHEET 2.
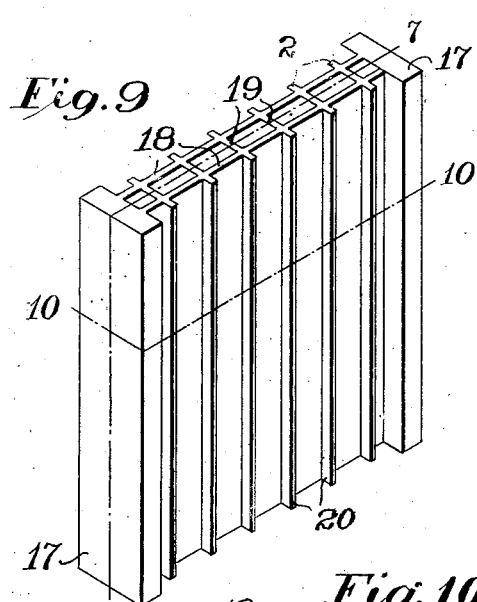
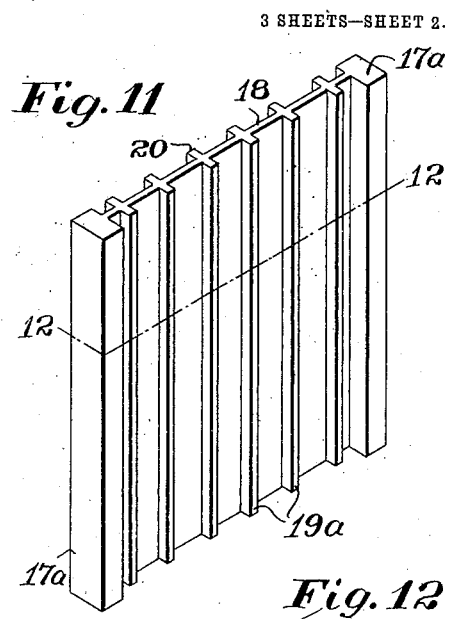
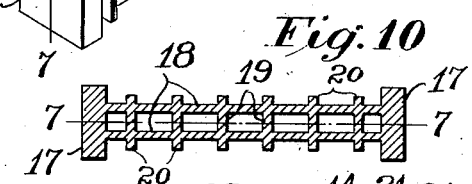
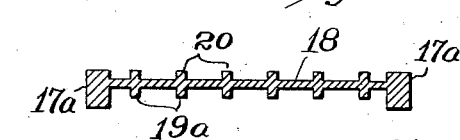
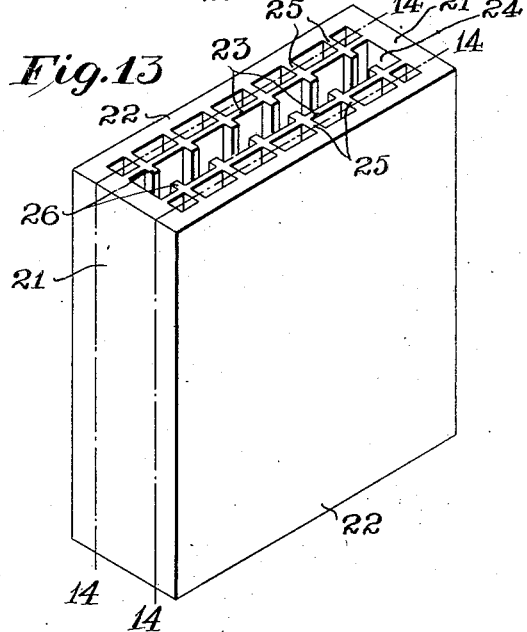
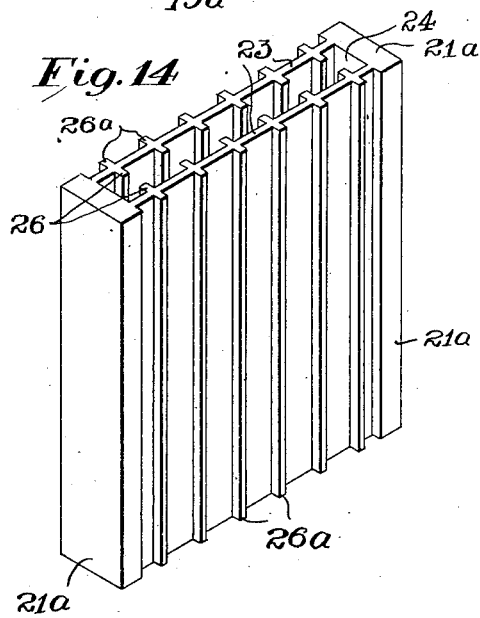
WITNESSES:
INVENTOR
Frank A. Decker
BY
Chas. N. Butler
ATTORNEY.

No. 839,815. PATENTED JAN. 1, 1907.
F. A. DECKER.
MANUFACTURE OF ELEMENTS FOR BATTERIES OR ELECTROLYTIC APPARATUS.
APPLICATION FILED MAY 9, 1904.
3 SHEETS—SHEET 3.
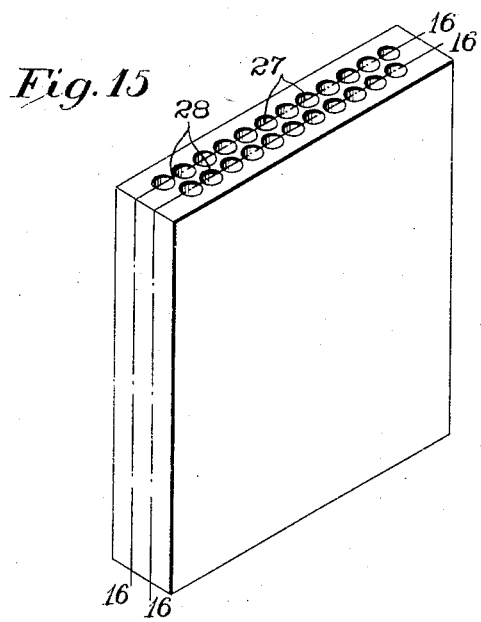
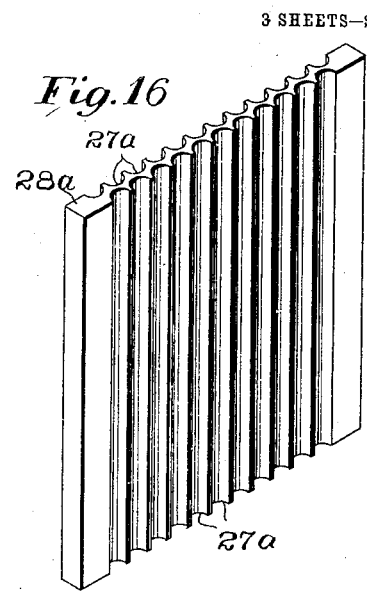
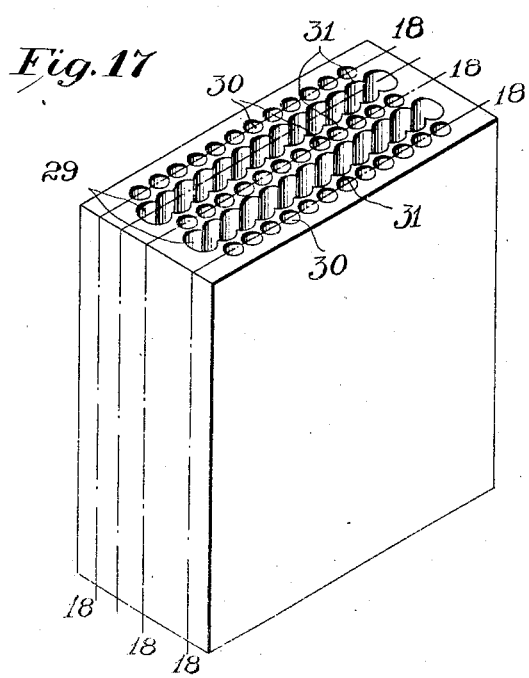
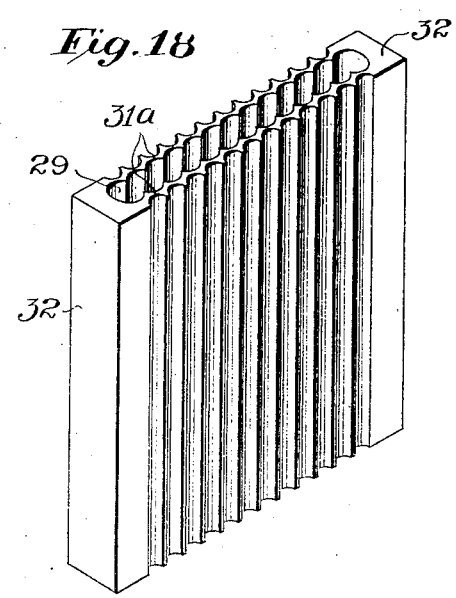
WITNESSES:
INVENTOR
Frank A Decker
BY
Chas. N. Butler
ATTORNEY.

UNITED STATES PATENT OFFICE.

FRANK A. DECKER, OF PHILADELPHIA, PENNSYLVANIA, ASSIGNOR, BY MESNE ASSIGNMENTS, TO DECKER ELECTRICAL MANUFACTURING COMPANY, OF WILMINGTON, DELAWARE.

MANUFACTURE OF ELEMENTS FOR BATTERIES OR ELECTROLYTIC APPARATUS.

No. 839,815.     Specification of Letters Patent.     Patented Jan. 1, 1907.

Application filed May 9, 1904. Serial No. 206,981.

*To all whom it may concern:*

Be it known that I, FRANK A. DECKER, a citizen of the United States, residing at Philadelphia, county of Philadelphia, and State of Pennsylvania, have invented certain Improvements in the Manufacture of Elements for Batteries or Electrolytic Apparatus, of which the following is a specification.

This invention has as its object the production of improved parts suitable for use as electrodes, diaphragms, or compartments having such slight thickness as to produce low resistance and permit high electrical efficiency to be obtained.

In the manufacture of electrodes, diaphragms, compartments, and the like by molding and baking mineral matter or extruding molten mineral matter (as clay or carbon) these operations when producing them in final form of the thinness required for obtaining the desired high efficiency and low resistance have been attended with cracking and warping to such an extent that the desired results could not be obtained thereby.

In the present improvements the material which it is desired to use is extruded or molded and baked and then separated or reduced to such form as is desired in the finished product, the original shape being of such character as to stand up against destruction or injury in the operations of extruding or molding and baking. The final product thus obtained may readily be made to comprise a form quite thin and of large superficial area within comparatively confined borders, providing high efficiency and low resistance, while avoiding the difficulties obtaining in molding and baking the same products singly or in final form. The initial forms may be produced by means of molds or dies by compression or extrusion. The reductions may be effected by subjecting the original form to grinding, sand-blasting, splitting, or like operations suitable for obtaining the desired final form or forms from the originals operated upon.

Figure 3:
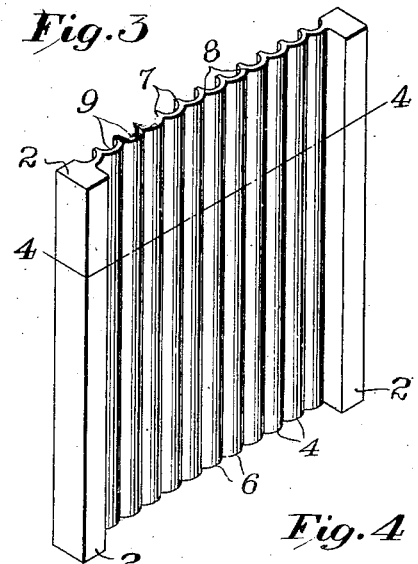
Figure 2:
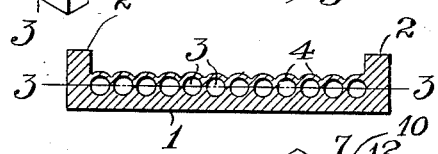
Figure 4:
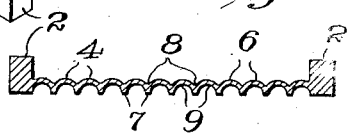
Figure 5:
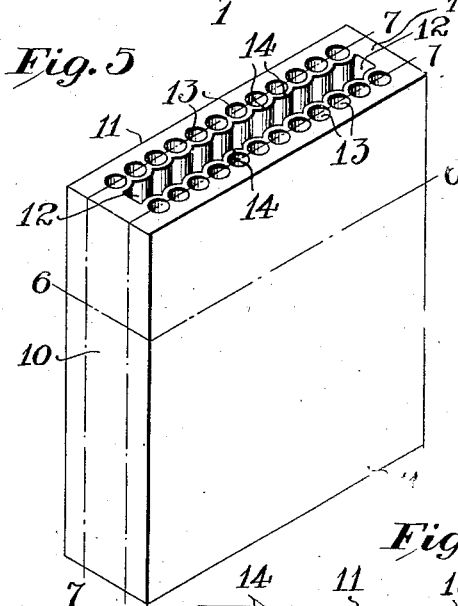
Figure 7:
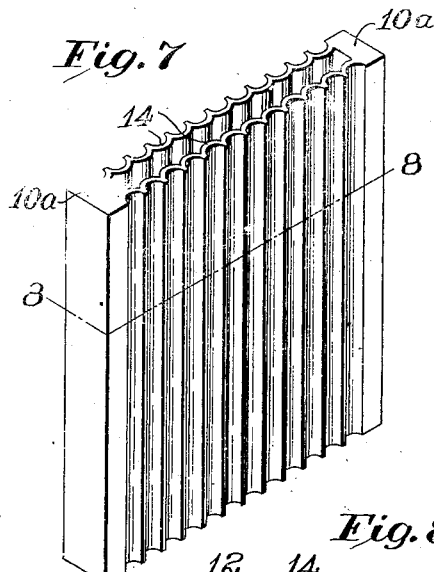
Figure 6:
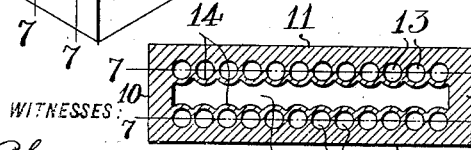
Figure 8:
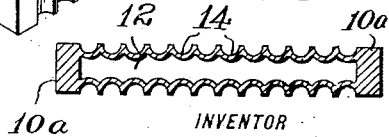

In the accompanying drawings, illustrating my improvements, Figure 1 is a perspective view, and Fig. 2 is a sectional view, on the line 2 2 of Fig. 1, representing an initial form. Fig. 3 is a perspective view, and Fig. 4 is a sectional view, taken on the line 4 4 of Fig. 3, representing a plate obtained from the form shown in Figs. 1 and 2 by reducing the same to or dividing it on the line 3 3. Fig. 5 is a perspective view, and Fig. 6 is a sectional view, taken on the line 6 6 of Fig. 5, representing a second initial form. Fig. 7 is a perspective view, and Fig. 8 is a sectional view, taken on the line 8 8 of Fig. 7, representing a cup or compartment obtained from the form shown in Figs. 5 and 6 by reducing the same to or dividing it on the lines 7 7. Fig. 9 is a perspective view, and Fig. 10 is a sectional view, taken on the line 10 10 of Fig. 9, representing a third initial form. Fig. 11 is a perspective view, and Fig. 12 is a sectional view, taken on the line 12 12 of Fig. 11, representing a plate produced by splitting the form shown in Figs. 9 and 10 on the line 7 7. Fig. 13 is a perspective view of a fourth initial form, and Fig. 14 represents a perspective view of a cup or compartment produced therefrom by cutting to or through the lines 14 14. Fig. 15 is a perspective view of a fifth initial form, and Fig. 16 is a perspective view of a plate produced therefrom by cutting to or through the lines 16 16. Fig. 17 is a perspective view of a sixth initial form, and Fig. 18 is a perspective view of a cup or compartment produced therefrom by cutting to or through the lines 18 18.

As shown in Figs. 1 and 2, the initial form may consist of a body 1, having the flanges 2 thereon and the tubular holes 3 therethrough, the walls 4 of the holes being curved and may be as thin as required in the final product or of greater thickness to be cut down to the thin section desired. By cutting down to or splitting on the lines 3 3 the form shown in Figs. 3 and 4 may be produced, comprising a corrugated or furrowed plate having the bordering flanges 2 and the walls 4. This plate, if desired, may be further reduced by removing material from the convex surfaces 6, the ribs 7, or the concave surfaces 8 and 9. Such a plate, whether used alone or as part of an envelop, has in its irregular configuration means for preventing a juxtaposed element from stopping the circulation of fluid in contact with its surface.

As shown in Figs. 5 and 6, the initial form comprises the end walls 10 and the side walls 11, forming the compartment 12, the side walls having the tubular holes 13 therein provided with the thin curved interior walls 14. This form is cut down to or divided on the lines 7 7 to produce the envelop or compartment shown in Figs. 7 and 8, having the end walls 10ª and the corrugated or furrowed side walls 14.

As shown in Figs. 9 and 10, the initial form may comprise the end walls 17 and the side walls 18, the latter being joined by the septa 19 and having the exterior ribs 20 thereon. By splitting this form on the lines 7 7. the plate shown in Figs. 11 and 12 is produced, comprising the flange borders 17ª and the plate 18, having the spacing-ribs 19ª and 20, forming a furrowed diaphragm.

As shown in Fig. 13, the initial form comprises the end walls 21, the side walls 22, the plates 23, the compartment 24 within the plates and end walls, the septa 25, joining the plates and the side walls, and the ribs 26 on the plate within the compartment. By cutting down to or splitting on the lines 14 14 the envelop or compartment shown in Fig. 14 is produced, having the ends 21ª and the plates 23, provided with the spacing-ribs 26 and 26ª, forming furrowed sides therefor.

As shown in Fig. 15, the initial form comprises a plate having the parallel rows of holes 27 therethrough, the holes of the respective rows being staggered with respect to each other and separated by the septa 28. The final form is produced by cutting down to or on the lines 16 16 to produce a corrugated or furrowed plate 28ª, having the concavities 27ª in its opposite walls staggered with respect to each other, as shown in Fig. 16.

As shown in Fig. 17, the original form comprises a block having the compartments 29 and the rows of holes 30 therein, the holes being separated from the compartments by the septa 31. The final form shown in Fig. 18, produced from the initial form by cutting on the lines 18 18, comprises the envelop or compartment 29, having end walls 32 and furrowed or corrugated side walls 31ª, the concavities on the opposite faces thereof being staggered with respect to each other.

It will be understood that the parts may be made of amorphous carbon or graphite to act as electrodes and separators in primary cells or of porous earthenware to act as separators for the electrodes or solutions in primary and secondary batteries and electrolytic apparatus.

The term "furrowed" is to be understood as designating any surface having a wavy, corrugated, or ribbed conformation, the term "plate" as designating either a single electrode or separator or a part of an envelop, compartment, or cup, and the expression "hollow body" as designating a body having one or more compartments or holes therein.

It is to be understood that by reason of the thin character required in the parts to be formed it is important that the body should be molded and baked with the walls joined and braced intermediately of their edges. For example, in the several figures of the drawings, as in Fig. 9, the body of the molded and baked form is virtually hollow and is provided with side walls, as 18, joined by the septa 19, which brace such walls at places intermediate of their edges, the same characteristic idea being found in the forms shown in Figs. 1, 5, 13, 15, and 17.

Having described my invention, I claim—

1. The manufacture of parts for batteries or electrolytic apparatus which consists in forming and baking a hollow body having holes therein lying in parallel planes, and then splitting said body on the line of one or more of said planes, substantially as specified.

2. The manufacture of parts for batteries or electrolytic apparatus which consists in forming and baking a body having parallel holes therethrough, and then splitting said body through said holes, substantially as specified.

3. The manufacture of parts for batteries and electrolytic apparatus which consists in forming and baking a body having holes therein, and then separating therefrom a portion of said body so as to produce a furrowed plate or plates.

4. The manufacture of parts for batteries and electrolytic apparatus which consists in forming and baking a body with holes therein, then separating therefrom a portion so as to produce a reinforced furrowed plate.

In testimony whereof I have hereunto set my hand, this 6th day of May, 1904, in the presence of the subscribing witnesses.

FRANK A. DECKER.

Witnesses:
THOMAS S. GATES,
UTLEY E. CRANE, Jr.